United States Patent
Buras et al.

(10) Patent No.: US 7,365,111 B2
(45) Date of Patent: Apr. 29, 2008

(54) USE OF ZINC OXIDE TO IMPROVE COMPATIBILITY OF POLYMER MODIFIED ASPHALT CROSSLINKED WITH PHENOL ALDEHYDE RESIN

(75) Inventors: Paul J. Buras, West University Place, TX (US); Joseph R. Bruns, Humble, TX (US); William Lee, Atascocita, TX (US)

(73) Assignee: Fina Technology, Inc., Houston, TX (US)

( * ) Notice: Subject to any disclaimer, the term of this patent is extended or adjusted under 35 U.S.C. 154(b) by 450 days.

(21) Appl. No.: 11/020,774

(22) Filed: Dec. 23, 2004

(65) Prior Publication Data

US 2006/0142436 A1    Jun. 29, 2006

(51) Int. Cl.
*C08L 95/00* (2006.01)
(52) U.S. Cl. .............................. 524/68; 524/70; 524/71
(58) Field of Classification Search .................. 524/68, 524/70–71
See application file for complete search history.

(56) References Cited

U.S. PATENT DOCUMENTS 5,256,710 A    10/1993   Krivohlavek
7,081,492 B1 *  7/2006   Krivohlavek ............... 524/476

OTHER PUBLICATIONS

Grant & Hackh's Chemical Dictonary, Fifth Edition, McGraw-Hill Book Company, 1987, p. 516.*
SUPERPAVE Series No. 1 (SP-1), 1997 printing, pp. ii-67, published by Asphalt Institute (Research Park Drive, P.O. Box 14052, Lexington, KY 40512-4052).

* cited by examiner

*Primary Examiner*—Peter Szekely
(74) *Attorney, Agent, or Firm*—Shirley A. Kopecky

(57) ABSTRACT

In methods of preparing asphalt and elastomeric polymer compositions crosslinked with phenol aldehyde resins and sulfur, such as polymer modified asphalt (PMA), it has been discovered that the MP1 compatibility may be improved by adding certain ionic metal oxides. Suitable ionic metal oxides include, but are not necessarily limited to, zinc oxide, cadmium oxide, and the like. Acceptable elastomeric polymers include, but are not necessarily limited to, styrene-butadiene copolymers. Additional sulfur-containing crosslinkers may also be used.

13 Claims, 3 Drawing Sheets

BBR m-value

FIG. 3 - DSR Response
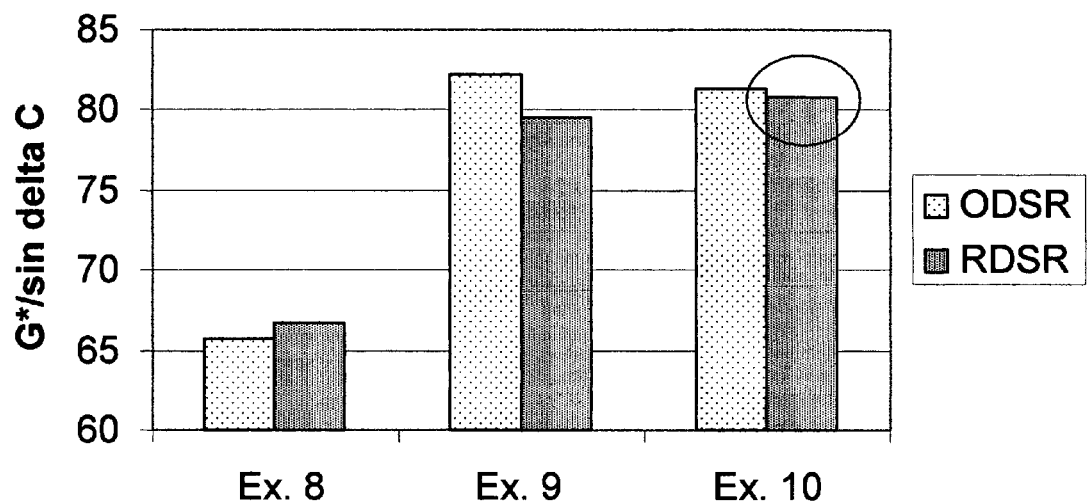
FIG. 4 - Low Temperature
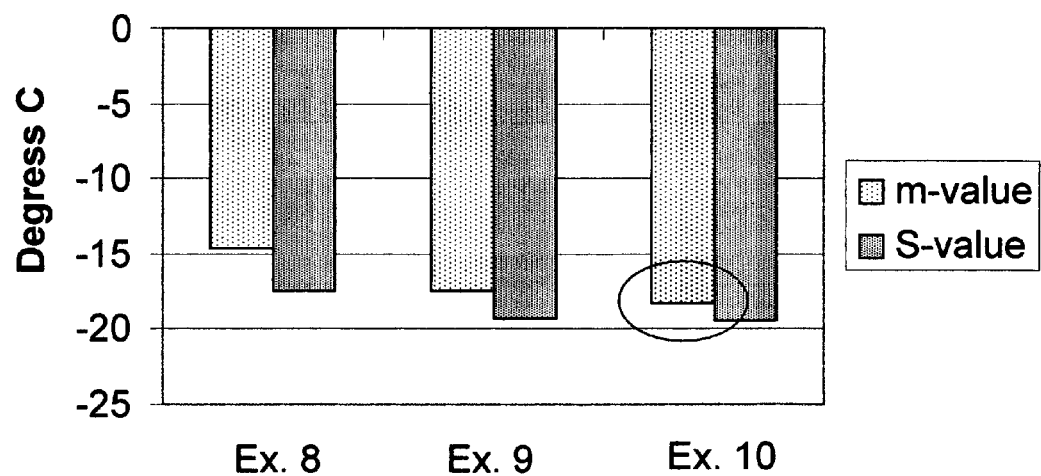

USE OF ZINC OXIDE TO IMPROVE COMPATIBILITY OF POLYMER MODIFIED ASPHALT CROSSLINKED WITH PHENOL ALDEHYDE RESIN

FIELD OF THE INVENTION

The present invention is related to hydrocarbon-based binders, such as bitumens, asphalts and tars, modified with elastomers, and including a vulcanized stage, which are particularly useful as industrial coatings and road bitumens, or the like. It relates more particularly to processes for obtaining vulcanized compositions based on bitumens and on styrene/butadiene copolymers that are cross-linked with phenol aldehyde resins.

BACKGROUND OF THE INVENTION

The use of bitumen (asphalt) compositions in preparing aggregate compositions (including, but not just limited to, bitumen and rock) useful as road paving material is complicated by at least three factors, each of which imposes a serious challenge to providing an acceptable product. First, the bitumen compositions must meet certain performance criteria or specifications in order to be considered useful for road paving. For example, to ensure acceptable performance, state and federal agencies issue specifications for various bitumen applications including specifications for use as road pavement. Current Federal Highway Administration specifications require a bitumen (asphalt) product to meet defined parameters relating to properties such as viscosity, stiffness, penetration, toughness, tenacity and ductility. Each of these parameters defines a critical feature of the bitumen composition, and compositions failing to meet one or more of these parameters will render that composition unacceptable for use as road pavement material.

Conventional bitumen compositions frequently cannot meet all of the requirements of a particular specification simultaneously and, if these specifications are not met, damage to the resulting road may occur, including, but not necessarily limited to, permanent deformation, thermally induced cracking and flexural fatigue. This damage greatly reduces the effective life of paved roads.

In this regard, it has long been recognized that the properties of conventional bitumen compositions may be modified by the addition of other substances, such as polymers. For example, copolymers derived from styrene and conjugated dienes are particularly useful, since these copolymers have good solubility in bitumen compositions and the resulting modified-bitumen compositions have good rheological properties.

It is also known that the stability of polymer-bitumen compositions may be increased by the addition of crosslinking agents (vulcanizing agents) such as sulfur, frequently in the form of elemental sulfur. It is believed that the sulfur chemically couples the polymer and the bitumen through sulfide and/or polysulfide bonds. The addition of extraneous sulfur is used to produce the improved stability, even though bitumens naturally contain varying amounts of native sulfur. Other crosslinking agents are known, such as reactive phenol aldehyde resins, particularly phenol formaldehyde resins.

The second factor complicating the use of bitumen compositions concerns the viscosity stability of such compositions under storage conditions. In this regard, bitumen compositions are frequently stored for up to 7 days or more before being used and, in some cases, the viscosity of the composition may increase so much that the bitumen composition is unusable for its intended purpose. On the other hand, a storage-stable bitumen composition would provide for only minimal viscosity increases and, accordingly, after storage it may still be employed for its intended purpose.

Asphaltic concrete, typically including asphalt and aggregate, asphalt compositions for resurfacing asphaltic concrete, and similar asphalt compositions must exhibit a certain number of specific mechanical properties to enable their use in various fields of application, especially when the asphalts are used as binders for superficial coats (road surfacing), as asphalt emulsions, or in industrial applications. (The term "asphalt" is used herein interchangeably with "bitumen." Asphaltic concrete is asphalt used as a binder with appropriate aggregate added, typically for use in roadways.) The use of asphalt or asphalt emulsion binders either in maintenance facings as a surface coat or as a very thin bituminous mix, or as a thicker structural layer of bituminous mix in asphaltic concrete, is enhanced if these binders possess the requisite properties such as desirable levels of elasticity and plasticity.

As noted, various polymers have been added to asphalts to improve physical and mechanical performance properties. Polymer-modified asphalts (PMAs) are routinely used in the road construction/maintenance and roofing industries. Conventional asphalts often do not retain sufficient elasticity in use and, also, exhibit a plasticity range that is too narrow for use in many modern applications such as road construction. It is known that the characteristics of road asphalts and the like may be greatly improved by incorporating into them an elastomeric-type polymer which may be one such as butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and a conjugated diene. The modified asphalts thus obtained commonly are referred to variously as bitumen/polymer binders or asphalt/polymer mixes. Modified asphalts and asphalt emulsions typically are produced utilizing styrene/butadiene based polymers, and typically have raised softening point, increased viscoelasticity, enhanced force under strain, enhanced strain recovery, and improved low temperature strain characteristics as compared with non-modified asphalts and asphalt emulsions.

The bituminous binders, even of the bitumen/polymer type, which are presently employed in road applications often do not have the optimum characteristics at low enough polymer concentrations to consistently meet the increasing structural and workability requirements imposed on roadway structures and their construction. In order to achieve a given level of modified asphalt performance, various polymers are added at some prescribed concentration.

Current practice is to add the desired level of a single polymer, sometimes along with a reactant that promotes crosslinking of the polymer molecules until the desired asphalt properties are met. This reactant typically is sulfur in a form suitable for reacting, although as previously noted, other crosslinkers may be used.

However, the cost of the polymer adds significantly to the overall cost of the resulting asphalt/polymer mix. Thus, cost factors weigh in the ability to meet the above criteria for various asphalt mixes. In addition, at increasing levels of polymer concentration, the working viscosity of the asphalt mix becomes excessively great and separation of the asphalt and polymer may occur.

One of the methods commonly utilized in the industry to standardize the measure or degree of compatibility of the rubber with the asphalt is referred to as the compatibility test. The test comprises the mixing of the rubber and asphalt with all the applicable additives, such as the crosslinking agents. The mixture is placed in tubes, usually made of aluminum or similar material, referred to as "cigar tubes" or "toothpaste tubes". These tubes are about one inch in diameter and about fifteen centimeters deep. The mixture is placed in an oven heated to a temperature of about 162° C. (320° F.). This temperature is representative of the most commonly used asphalt storage temperature. After the required period of time, most commonly twenty-four (24) hours, the tubes are transferred from the oven to a freezer and cooled down to solidify. The tubes are kept in the vertical position. After cooling down, the tubes are cut into thirds; three equal sections. The ring-and-ball softening point of the top one third is compared to the softening point of the bottom section. This test gives an indication of the separation or compatibility of the rubber within the asphalt. The elastomer would have the tendency to separate to the top. The lower the difference in softening point between the top and bottom sections, the more compatible are the rubber and asphalt. In today's environment, most states require a difference of 4° F. (2° C.) or less to consider the asphalt/rubber composition as compatible. Few standards allow a higher difference. The twenty-four hour test is used as a common comparison point. The compatibility test is part of the Standard Specification for Performance Graded Asphalt Binder known as AASHTO MP1, or simply MP1, incorporated by reference herein.

An additional concern in the production of PMA is that the composition of the asphalt component may vary widely and occasionally the conventional methods of making the PMA do not meet the compatibility criteria mentioned because something is sufficiently different about the asphalt that makes it more difficult to incorporate the polymer therein. Since there are many different polymers that may be used and many ways of altering the techniques to make them, sometimes the use of a different polymer may provide better compatibility to the problematic asphalt. Changing the crosslinker system is another way trying to solve compatibility concerns. Despite the known approaches of solving compatibility issues, there is always the need for additional techniques to use when these difficulties arise. Furthermore, all possible permutations of the various components discussed above have not been tried in the art, nor is it obvious to try all such possibilities since it is impossible to predict in advance what the outcome of a particular combination would be, given the complexity of PMA systems and the numerous catalytic and non-catalytic reactions that must occur. The asphalt component is hardly a simple system in and of itself, and is composed a wide variety of compounds.

As may be seen from the above, methods are known to improve the mixing of asphalt and polymer compositions. The needed elements for the commercial success of any such process include keeping the process as simple as possible, reducing the cost of the ingredients, and utilizing available asphalt cuts from a refinery without having to blend in more valuable fractions. In addition, the resulting asphalt composition must meet the above-mentioned environmental concerns and governmental physical properties, such as compatibility. Thus, it is a goal of the industry to maintain or reduce the cost of the polymers and crosslinking agents added to the asphalt without sacrificing any of the other elements and improving the properties of the asphalt and polymer compositions as much as possible.

SUMMARY OF THE INVENTION

There is provided, in one form, a method for preparing asphalt and polymer compositions that includes heating a mixture of asphalt and an elastomeric polymer, adding a phenol aldehyde resin crosslinker to the mixture, adding sulfur to the mixture, and adding an ionic metal oxide to the mixture, in no particular order.

In another embodiment, there is provided a polymer modified asphalt (PMA) that includes an asphalt having an elastomeric polymer crosslinked therewith by a phenol aldehyde resin, sulfur and also including an ionic metal oxide.

The metal of the ionic metal oxide may be from Group IIB of the Periodic Table (CAS notation), and may be zinc, and further the ionic metal oxide may be zinc oxide.

There are additionally provided roads, roofs, methods of recycling asphalt using these methods, and recycled roads made with the PMAs described herein. Aggregate coated with the PMAs described herein are also provided.

BRIEF DESCRIPTION OF THE DRAWINGS

FIG. 3 is a chart of the DSR response results for Examples 8-10; and

FIG. 4 is a chart of the low temperature values for Examples 8-10.

DETAILED DESCRIPTION OF THE INVENTION

Figure 1:
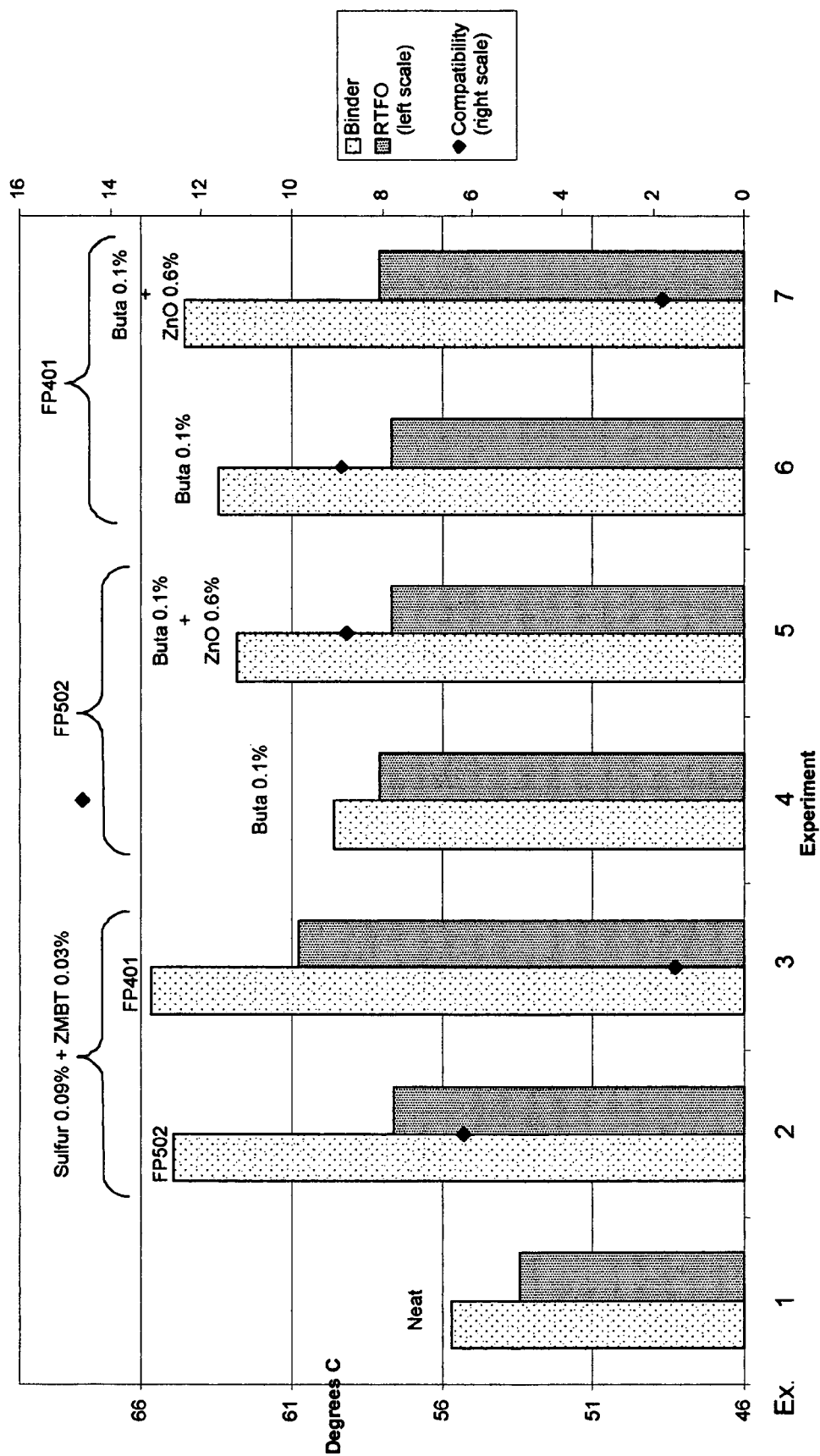
FIG. 1 is a chart of 4% rubber DSR and compatibility results for Examples 1-7.

It has been surprisingly discovered that the use of an ionic metal oxide such as zinc oxide may enhance the compatibility (as defined above) of certain asphalt and polymer combinations, particularly when the asphalt and the polymer are crosslinked with reactive phenol aldehyde resins and sulfur. To more fully explain the advantages herein, it is helpful to review several terms used herein.

In the context of methods and compositions herein, the term "asphalt" (sometimes referred to as "bitumen") refers to all types of bitumens, including those that occur in nature and those obtained in petroleum processing. The choice of bitumen will depend essentially on the particular application intended for the resulting bitumen composition. Bitumens that may be used may have an initial viscosity at 140° F. (60° C.) of about 600 to about 3000 poise (about 60 to about 300 Pa-s) depending on the grade of asphalt desired. The initial penetration range (ASTM D5) of the base bitumen at 77° F. (25° C.) is about 20 to about 320 dmm, and may be about 50 to about 150 dmm, when the intended use of the copolymer-bitumen composition is road paving. Bitumens that do not contain any copolymer, sulfur, etc., are sometimes referred to as a "base bitumen."

"Elastomeric polymers" are natural or synthetic rubbers and include, but are not necessarily limited to, butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of a vinyl aromatic compound, e.g. styrene, and conjugated dienes. In one non-limiting embodiment, styrene/conjugated diene block copolymers may be used that are linear, radial, or multi-branched. Styrene/butadiene and styrene/isoprene copolymers having an average molecular weight of between 30,000 and 300,000 have been found to be particularly useful in the present compositions.

"Conjugated dienes" refer to alkene compounds having 2 or more sites of unsaturation wherein a second site of unsaturation is conjugated to a first site of unsaturation, i.e., the first carbon atom of the second site of unsaturation is gamma (at carbon atom 3) relative to the first carbon atom of the first site of unsaturation. Conjugated dienes include, by way of non-limiting example, butadiene, isoprene, 1,3-pentadiene, and the like.

"Block copolymers of styrene and conjugated-dienes" refer to copolymers of styrene and conjugated-dienes having a linear or radial, tri-block structure consisting of styrene-conjugated diene-styrene block units that are copolymers are represented by the formula:

$$S_x-D_y-S_z$$

where D is a conjugated-diene, S is styrene, and x, y and z are integers such that the number average molecular weight of the copolymer is from about 30,000 to about 300,000. These copolymers are well known to those skilled in the art and are either commercially available or may be prepared from methods known in the art. Such tri-block copolymers may be derived from styrene and a conjugated-diene, wherein the conjugated-diene is butadiene or isoprene. Such copolymers may contain about 15 to about 50 percent by weight copolymer units derived from styrene, alternatively may contain about 20 to about 35 percent derived from styrene, and then again may contain about 28 to about 31 percent derived from styrene, the remainder being derived from the conjugated diene. These copolymers may have a number average molecular weight range between about 50,000 and about 400,000, and alternatively have a number average molecular weight range between about 80,000 and about 180,000. The copolymer may employ a minimal amount of hydrocarbon solvent in order to facilitate handling. Examples of suitable solvents include plasticizer solvent that is a non-volatile aromatic oil. However, when the hydrocarbon solvent is a volatile solvent (as defined above), care should be taken to ensure that the amount of solvent contained in the final bitumen composition is less than about 3.5 weight percent.

In the method and compositions herein, reactive phenol aldehyde resins, and in one non-limiting embodiment, reactive phenol formaldehyde resins are crosslinkers between the polymer and the asphalt in making the PMAs herein. The use of phenolic and/or phenol-formaldehyde resins as crosslinking agents has the advantage of not gelling the rubber polymer asphalt composition whereas only using elemental sulfur sometimes does or sometimes cause a gel at the same use level, and is therefore useless in commercial applications. Avoidance of gels is desirable because the material remains a liquid, in contrast to including solids or gels therein that are difficult to process.

Other useful and/or desirable improvements or characteristics to polymer modified asphalts that may be obtained as a result of using phenolic or phenol aldehyde resins include, but are not necessarily limited to: improved or higher ball and ring softening point; higher absolute viscosity at 60° C., lower penetration at 25° C. and higher percent elastic recovery values at 10° C. Where chemically unbound elemental or free sulfur is incorporated into the process, crosslinked products of intermediate values between those of sulfur alone and the phenol and/or phenol formaldehyde resins may be obtained.

The phenolic and phenol-formaldehyde resins mentioned above are of the general chemical structures and/or forms and/or compositions that permit them to be useful as crosslinking or vulcanizing agents. These materials are commercially manufactured and made available for the specific purpose of acting as sulfur free crosslinking or vulcanizing agents.

The chemical structure and/or form and/or composition of these cross-linking or vulcanizing agents typically vary substantially from the types of phenols and/or aldehydes conventionally used as the source of or for the polymer structure. In actual practice then, the phenol or formaldehyde as the polymer source are homopolymerized in situ to create higher molecular weight homologs of themselves. Phenols and formaldehyde reaction products of such chemical and physical composition that lend themselves to act as cross-linking or vulcanizing agents are generally not further polymerized in situ to create higher molecular weight homologs of themselves. Rather, these type phenols and/or formaldehyde are themselves the component of a final product and have acted as the cross-linking or vulcanizing agent or chemical to crosslink or vulcanize various types of rubber (saturated, unsaturated, natural or synthetic) into higher molecular products. Suitable phenol aldehyde resin crosslinkers include, but are not necessarily limited to those described in U.S. Pat. No. 5,256,710, incorporated by reference herein in its entirety.

In the methods herein, sulfur or sulfur-containing derivatives may be optional, additional crosslinkers. The term "sulfur" is defined herein as elemental sulfur in any of its physical forms, whereas the term "sulfur-containing derivative" includes any sulfur-donating compound, including elemental sulfur. Sulfur-donating compounds are well known in the art and include various organic compositions or compounds that generate sulfur under the mixing or preparation conditions herein. In one non-limiting embodiment, the elemental sulfur is in powder form known as flowers of sulfur. Other sulfur-containing derivatives or species that may be used include, but are not necessarily limited to mercaptobenzothiazole, thiurams, and the like, and combinations thereof. In another non-limiting embodiment, the sulfur is present in an amount ranging from about 0.06% to about 0.3 wt. % based on the asphalt, and alternatively is present in an amount from about 0.08 to about 0.2 wt. %.

Mercaptobenzothiazole (MBT), thiurams, and mixtures thereof are also suitable crosslinkers falling within the definition of sulfur-containing derivatives. It is common in the preparation of polymer-modified asphalts to include activators and accelerators to make the crosslinking reaction proceed faster. MBT and the zinc salt of mercaptobenzothiazole (ZMBT) are conventional crosslinker accelerators.

One acceptable type of sulfur-containing derivatives includes, but is not limited to, thiuram polysulfides. Suitable thiuram polysulfides have the formula:

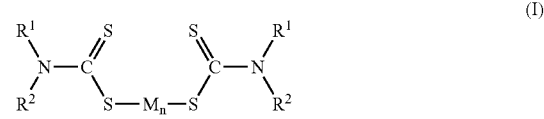

(I)

where $R^1$ and $R^2$ are the same or different alkyl substituents having from 1 to 4 carbon atoms, and wherein M is a metal selected from zinc, barium or copper, and n is 0 or 1. In another non-limiting embodiment, a crosslinking temperature range for thiuram polysulfides of formula (I) is above about 180° C. (356° F.), alternatively, the crosslinking temperature range may be between about 185 and about 190° C. (365-374° F.). In one non-restrictive version, an optimal crosslinking temperature range for a particular crosslinker is determined empirically. In another non-limiting embodiment, the optimal crosslinking temperature range is about 20° C. wide, in one non-restrictive embodiment about 10° C. wide, in another non-limiting embodiment about 4° C. wide, and in yet another non-limiting embodiment about 5° C. wide or less.

In another non-restrictive version, the phenol aldehyde resin crosslinker is present in an amount ranging from about 0.01 to 2.0 wt %, based on the weight of the asphalt/polymer mixture. In another embodiment, the crosslinker is present in an amount ranging from about 0.05 to 1.0 wt %. Optional other sulfur and sulfur-containing derivatives may also independently fall within these ranges as well.

The term "desired Rheological Properties" refers primarily to the SUPERPAVE asphalt binder specification designated by AASHTO as MP1 which is hereby incorporated by reference in its entirety. Additional asphalt specifications may include viscosity at 140° F. (60° C.) of from about 1600 to about 4000 poise (160-400 Pa-s) before aging; a toughness of at least 110 inch-pound (127 cm-kilograms) before aging; a tenacity of at least 75 inch-pound (87 cm-kilograms) before aging; and a ductility of at least 25 cm at 39.2° F. (4° C.) at a 5 cm/min. pull rate after aging.

Viscosity measurements are made by using ASTM test method D2171. Ductility measurements are made by using ASTM test method D113. Toughness and tenacity measurements are made by a Benson Method of Toughness and Tenacity, run at 20 inches/minute (50.8 cm/minute) pull rate with a ⅛ inch (2.22 cm) diameter ball.

The term "aggregate" refers to rock and similar material added to the bitumen composition to provide an aggregate composition suitable for paving roads. Typically, the aggregate employed is rock indigenous to the area where the bitumen composition is produced. Suitable aggregate includes granite, basalt, limestone, and the like.

As used herein, the term "asphalt cement" refers to any of a variety of substantially solid or semi-solid materials at room temperature that gradually liquify when heated. Its predominant constituents are bitumens, which may be naturally occurring or obtained as the residue of refining processing.

The asphalt terms used herein are well known to those skilled in the art. For an explanation of these terms, reference is made to the booklet SUPERPAVE Series No. 1 (SP-1), 1997 printing, published by the Asphalt Institute (Research Park Drive, P.O. Box 14052, Lexington, Ky. 40512-4052), which is hereby incorporated by reference in its entirety. For example, Chapter 2 provides an explanation of the test equipment, terms, and purposes. Rolling Thin Film Oven (RTFO) and Pressure Aging Vessel (PAV) are used to simulate binder aging (hardening) characteristics. Dynamic Shear Rheometers (DSR) are used to measure binder properties at high and intermediate temperatures. This is used to predict permanent deformation or rutting and fatigue cracking. Bending Beam Rheometers (BBRs) are used to measure binder properties at low temperatures. These values predict thermal or low temperature cracking. The procedures for these experiments are also described in the above-referenced SUPERPAVE booklet.

Asphalt grading is given in accordance with accepted standards in the industry as discussed in the above-referenced Asphalt Institute booklet and MP1. For example, pages 62-65 of the booklet include a table entitled Performance Graded Asphalt Binder Specifications. The asphalt compositions are given performance grades, for example, PG 64-22. The first number, 64, represents the average 7-day maximum pavement design temperature in ° C. The second number, −22, represents the minimum pavement design temperature in ° C. Other requirements of each grade are shown in the table. For example, the maximum value for the PAV-DSR test (° C.) for PG 64-22 is 25° C.

In accordance with one non-limiting embodiment, an asphalt composition is prepared by adding the asphalt or bitumen to a mixing tank that has stirring means. The asphalt is added and stirred at elevated temperatures. Stirring temperatures depend on the viscosity of the asphalt and may range up to 500° F. (260° C.). Other suitable stirring temperatures were given previously. Asphalt products from refinery operations are well known in the art. For example, asphalts typically used for this process are obtained from deep vacuum distillation of crude oil to obtain a bottom product of the desired viscosity or from a solvent deasphalting process that yields a demetallized oil, a resin fraction and an asphaltene fraction. Some refinery units do not have a resin fraction. These materials or other compatible oils of greater than 450° F. (232° C.) flash point may be blended to obtain the desired viscosity asphalt. In polymer-modified asphalt (PMA) processing, care must be taken in not subjecting the asphalt/polymer composition to elevated temperatures for too long to avoid thermal degradation of the polymer.

Rubbers, elastomeric polymers, or thermoplastic elastomers suitable for this application are well known in the art as described above. For example, FINAPRENE® products available from Total Petrochemicals Inc. are suitable for the compositions and methods herein. This example is not limiting for the inventive technology that may be applied to any similar elastomeric product particularly those produced from styrene and butadiene.

As noted, it has been discovered that the presence of certain metal oxides may improve the compatibility of certain asphalts and polymers. There are some asphalts that are difficult or impossible to make compatible with rubber using standard crosslinking technology. There is some indication that acids present in the asphalt may interfere with vulcanization. Without wishing to be limited to any particular theory, it may be that the ionic metal oxide could neutralize the acids in the troublesome asphalts. In one non-limiting embodiment, the metal in the ionic metal oxide may be selected from Group IIB of the Periodic Table (CAS notation). Specific examples of suitable metal oxides include, but are not necessarily limited to zinc oxide, cadmium oxide, and combinations thereof It is also expected that in some embodiments, other known accelerators, particularly ZMBT, when used in excess could also aid compatibility.

The amount of ionic metal oxide normally used depends upon a number of complex interrelated factors, including, but not necessarily limited to the type and proportions of asphalt and elastomeric polymer, the temperature at which the mixture is heated, the type of ionic metal oxide etc. Nevertheless, to give some idea of proportions typically used, the amount of ionic metal oxide may range from about 0.1 to about 1.0 wt. % based on the mixture. In an alternate, non-limiting embodiment, the amount of metal oxide ranges from about 0.2 to about 0.6 wt %, based on the mixture of asphalt and elastomeric polymer.

The amount of ionic metal salt normally used depends upon a number of complex interrelated factors, including, but not necessarily limited to the type and proportions of asphalt and elastomeric polymer, the temperature at which the mixture is heated, the type of ionic metal salt etc. Nevertheless, to give some idea of proportions typically used, the amount of ionic metal salt may range from about 0.1 to about 1.0 wt. % based on the mixture. In an alternate, non-limiting embodiment, the amount of metal oxide ranges from about 0.2 to about 0.6 wt %, based on the mixture of asphalt and elastomeric polymer.

Various other additives suitable for the purposes of these compositions and methods include, but are not necessarily limited to, known and future accelerators, activators, and the like. A variety of accelerators may be used in conjunction with these PMAs, including, but not limited to, dithiocarbamates and benzothiazoles.

The methods and compositions of the methods and compositions discussed herein will be further illustrated with respect to particular Examples that are only intended to more fully illuminate the methods and compositions and not limit them in any way.

EXAMPLES 1-7

A particular asphalt, Asphalt A, has been historically difficult to modify, with significant loss on RTFO DSR results typically observed. This work investigates the behavior of the asphalt modified with a linear styrene-butadiene-styrene (SBS) copolymer, FINAPRENE® 502 (FP502), having a 30/70 polystyrene/butadiene ratio and a radial SBS copolymer, FINAPRENE® 401 (FP401), having a 20/70 polystyrene/butadiene ratio. The effects of crosslinking with a TEXPAR "Butaphalt 790" phenol formaldehyde resin versus FINAFLEX200 XL crosslinking system (available from Total Petrochemical) are also considered in the presence of zinc oxide. Butaphalt 790 is known to contain a small amount of elemental sulfur.

These experiments modifies Asphalt A with 4% SBS. FP502 linear copolymer and FP401 radial copolymer were selected since these polymers have shown the widest range of compatibility in asphalt with crosslinking. PMA blends with each polymer were submitted to the following crosslinking additions: a) 0.9% sulfur, 0.3% ZMBT (FINAFLEX XL), b) 0.1% Butaphalt 790, c) 0.1% Butaphalt 790 and 0.6% ZnO (Butaphalt/ZnO). Results of MP1 tests and compatibility were used to compare the effectiveness of the crosslinking systems.

Procedure

A portion of Asphalt A was prepared and graded according to MP1 to provide a reference for modification improvement. The asphalt was heated and mixed with 4% of the specified polymer. The blend was mixed at high shear for 30 minutes at 360° F. (182° C.). The specified crosslinker was added slowly over a 5-minute period to the PMA blend and mixed at low shear for 1 hour at 360° F. (182° C.). The blend was then placed in an oven at 325° F. (163° C.) for 24 hours to cure. Following the cure, the blend was MP1 graded and tested for tube compatibility at 325° F. (163° C.).

Results and Discussion

MP1 performance grading of the neat Asphalt A found the starting reference grade as a PG52-22. The high temperature grade was determined by the lower RTFO G*/sin δ value of 53.4° C. shown in Table 1. The RTFO G*/sin δ continued to limit the high temperature grade throughout the experiment.

Modification of the asphalt with SBS results in a wide range of results. From FIG. 1 it is apparent that modification with FP401 is the most compatible polymer yielding the lowest tube compatibility results when treated with Finaflex XL, or with the Butaphalt/ZnO crosslinker.

Figure 2:
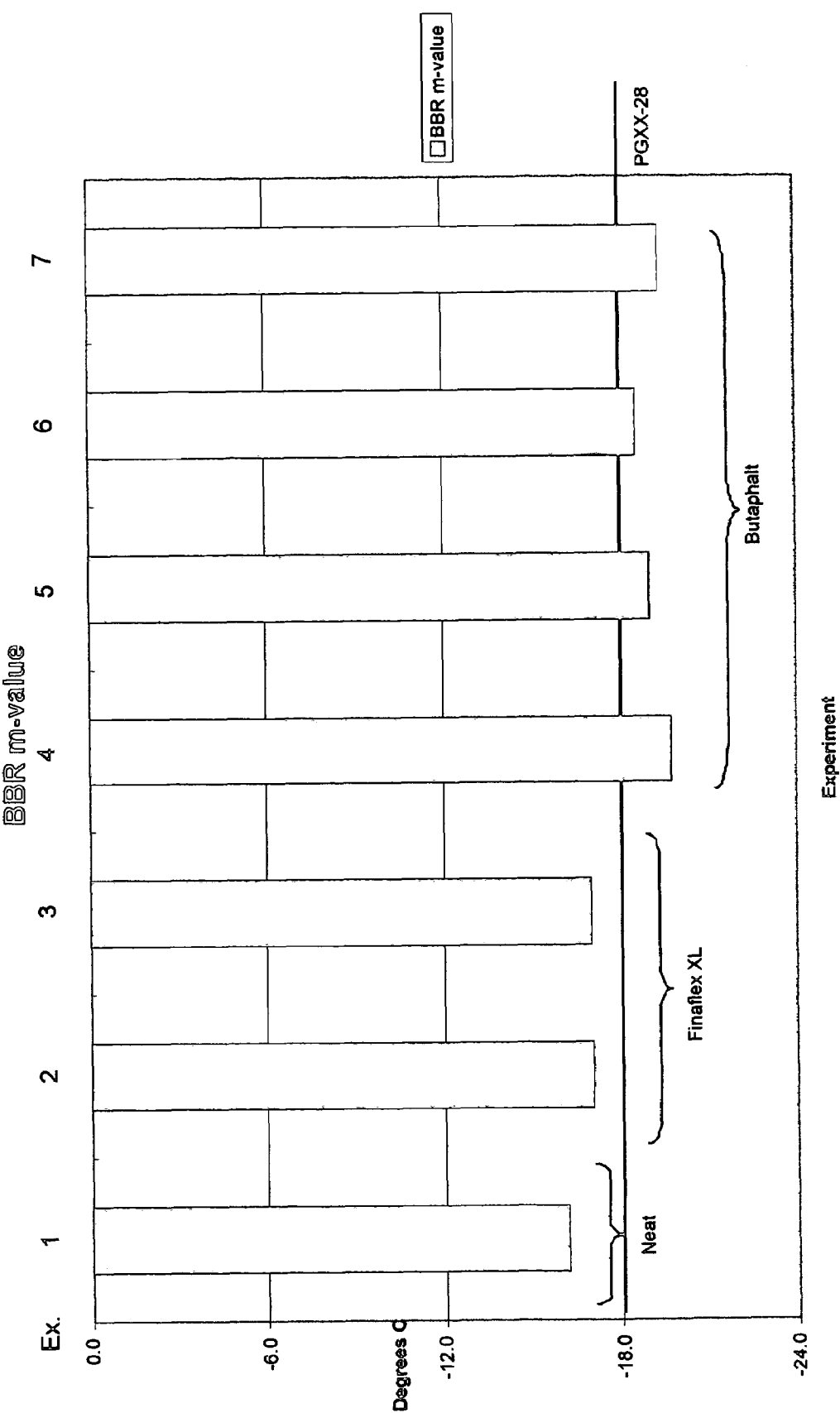
FIG. 2 is a chart of the BBR m-values for Examples 1-7.

Crosslinking with FP401 and XL yielded the best high temperature results; however, a slight deterioration of the low temperature was observed in FIG. 2 with the PG grade falling short of the PG XX-28 grade achieved with the PMA crosslinked with the Butaphalt 790.

Of particular interest is the effect of the 0.6% addition of ZnO to the Butaphalt blends. Results in FIG. 1 show a significant improvement in compatibility when the ZnO is added to either the FP502 or the FP401 blends crosslinked with Butaphalt 790. The FP502 compatibility is improved from 14.6° F. (8.1° C.) by 5.8° F. down to 8.8° F. (3.2 to 4.9° C.). Although this does not meet the typical compatibility requirement of a separation of no more than 4° F. (2° C.), it substantiates the beneficial effect from the addition of ZnO to the crosslinking system. The FP401 compatibility is improved from 8.9° F. (5° C.) by 7.1° F. down to only 1.7° F. (3.9° C.) separation (1.0° C.). In addition to achieving a PMA blending meeting the compatibility separation requirements, the low temperature of the PMA is improved achieving a lower m-value than observed with the neat asphalt.

Although crosslinking with Finaflex XL shows a slight improvement to the low temperature values versus the neat asphalt; it is likely that the Butaphalt 790 treatment is reacting with the asphalt and improving its performance.

TABLE 1

Improving Compatibility of Asphalt A

| | | Example No. | | | | | | |
|---|---|---|---|---|---|---|---|---|
| | Units | 1 | 2 | 3 | 4 | 5 | 6 | 7 |
| Asphalt A | wt % | 100 | 96 | 96 | 95.9 | 95.3 | 95.9 | 95.3 |
| FP-502 | wt % | | 4 | | 4.0 | 4.0 | | |
| FP-401 | wt % | | | 4 | | | 4.0 | 4.0 |
| Sulfur | wt % | | 0.09 | 0.09 | | | | |
| ZMBT | wt % | | 0.03 | 0.03 | | | | |
| Butaphalt 790 | wt % | | | | 0.1 | 0.1 | 0.1 | 0.1 |
| ZnO | wt % | | | | | 0.6 | | 0.6 |
| Total | | 100 | 100.12 | 100.12 | 100 | 100 | 100 | 100 |
| 24 hr compatibility Top | ° F. | | 169.2 | 159.0 | 141.7 | 143.8 | 151.5 | 140.3 |
| | ° C. | | 76.2 | 70.6 | 60.9 | 62.1 | 66.4 | 60.2 |

TABLE 1-continued

Improving Compatibility of Asphalt A

| | | Units | Example No. | | | | | | |
|---|---|---|---|---|---|---|---|---|---|
| | | | 1 | 2 | 3 | 4 | 5 | 6 | 7 |
| | Bottom | ° F. | | 163.0 | 157.5 | 127.1 | 135 | 142.6 | 138.5 |
| | | ° C. | | 72.3 | 69.7 | 52.8 | 57.2 | 61.4 | 59.2 |
| | Difference | ° F. | | 6.2 | 1.5 | 14.6 | 8.8 | 8.9 | 1.8 |
| | | ° C. | | 3.9 | 0.9 | 8.1 | 4.9 | 5 | 1 |
| Softening Point | | ° F. | | 156.2 | 141.9 | 144.4 | 132.8 | 143.1 | 126.3 |
| Penetration | | dmm | 152.3 | 98.2 | 94.4 | 99.0 | 108.7 | 95.2 | 110.3 |
| Binder | | ° C. | 55.7 | 64.9 | 65.6 | 59.6 | 62.8 | 63.4 | 64.5 |
| RTFO | | ° C. | 53.4 | 57.6 | 60.8 | 58.1 | 57.7 | 57.7 | 58.1 |
| BBR m-value | | ° C. | −16.2 | −17.0 | −17.0 | −19.7 | −19.1 | −18.6 | −19.4 |
| BBR S-value | | ° C. | −17.8 | −19.9 | −20.4 | −20.6 | −19.8 | −20.0 | −20.3 |
| High Temp Response | | | | 1.1 | 1.9 | 1.2 | 1.1 | 1.1 | 1.2 |
| Low Temp Response | | | | −0.2 | −0.2 | −0.9 | −0.7 | −0.6 | −0.8 |

The results presented in Table 1 and FIGS. 1 and 2 show that Finaprene 401 was the most effective SBS rubber for Asphalt A. Crosslinking with Finaflex XL yielded the best high (top) temperature results; however, only a slight improvement in low (bottom) temperature was observed. Crosslinking with Butaphalt 790 was found to be less effective than Finaflex XL for high temperature improvement; however, it showed significant improvement in low temperature performance. Crosslinking with Butaphalt 790 and ZnO resulted in the most compatible blends having the best temperature spread. Most significantly, the addition of ZnO with Butaphalt 790 improved compatibility in the method.

EXAMPLES 8-10

Examples 8-10 were prepared where Example 8 is simply the neat Asphalt B, Example 9 employed a phenolic aldehyde resin crosslinker (Ribetak 7530E available from Schenectady International, Inc.) and sulfur in Asphalt B, and Example 10 used phenolic aldehyde resin crosslinker (Ribetak 7530E), sulfur and zinc oxide in Asphalt B. More specifically:

Example 9 was a PMA blend formulation consisting of 96 wt % Asphalt B, 4 wt % FP-502; crosslinked with 0.2 wt % Ribetak 7530E and 0.1 wt % S.

Example 10 was a PMA blend formulation consisting of 96 wt % Asphalt B, 4 wt % FP502; crosslinked with 0.2 wt % Ribetak 7530E and 0.1 ZnO/0.1 wt % S.

Procedure

The asphalt sample was heated to 350° F. (177° C.) with low shear mixing. The mixing was changed to high shear and the polymer added. Mixing continued on high shear for 1 hour at 350° F. (177° C.). The mixing was reduced to low shear. The crosslinking agents were added and mixing continued on low shear at 350° F. (177° C.) for 1 hour. The PMA mixtures were aged in an oven at 325° F. (163° C.) for 24 hours to cure. Following the cure, the blend was MP1 graded and tested for tube 24/48-hour compatibility at 325° F. (163° C.).

The results are given in Table 2 below.

TABLE 2

Improving the Compatibility of Asphalt B

| | Units | Example No. | | |
|---|---|---|---|---|
| | | 8 Neat | 9 Ribetak/S | 10 Ribetak/S/ZnO |
| Asphalt B | wt % | 100 | 96 | 96 |
| FP-502 | wt % | | 4 | 4 |
| ZnO | wt % | | | 0.1 |
| Sulfur | wt % | | 0.1 | 0.1 |
| Ribetak 7530E | wt % | | 0.2 | 0.2 |
| Total | | 100 | 100.3 | 100.4 |
| 24 hr Comp. | | | 0.5 | 1.2 |
| 48 hr Comp. | | | 3.7 | 1.5 |
| Binder DSR | | 65.7 | 82.2 | 81.3 |
| RTFO DSR | | 66.7 | 79.5 | 80.8 |
| PAV DSR | | 21.3 | 19.5 | 18.4 |
| BBR m-value | | −14.7 | −17.5 | −18.2 |
| BBR S-value | | −17.5 | −19.3 | −19.4 |

From Table 2 it may be seen that 48-hour compatibility improved with the addition of the zinc oxide, and that it is important for sulfur to be present. Both RDSR and m-value improved with the addition of ZnO. DSR response is charted in FIG. 3 and low temperature values m-value and S-value are charted in FIG. 4.

In the foregoing specification, the methods and compositions have been described with reference to specific embodiments thereof, and has been demonstrated as effective in providing methods for preparing asphalt and polymer compositions crosslinked with phenol aldehyde resins and sulfur with improved rubber compatibility through the use of ionic metal oxides. However, it will be evident that various modifications and changes may be made to the method without departing from the broader spirit or scope of the invention as set forth in the appended claims. Accordingly, the specification is to be regarded in an illustrative rather than a restrictive sense. For example, specific combinations or amounts of asphalt, polymer, crosslinkers, ionic metal oxides, and other components falling within the claimed parameters, but not specifically identified or tried in a particular PMA system, are anticipated and expected to be within the scope of this invention. Specifically, the method and compositions herein are expected to work with crosslinkers, rubber polymers and ionic metal oxides other than those exemplified herein.

We claim:

1. A method for preparing an asphalt and polymer composition comprising heating a mixture of asphalt and an elastomeric polymer; adding a phenol aldehyde resin crosslinker to the mixture; adding sulfur to the mixture; and adding an ionic metal oxide to the mixture, where the metal of the ionic metal oxide is selected from Groups IIB of the Periodic Table (CAS notation), where the crosslinker, sulfur, and the metal oxide are added in any order, and where the ionic metal oxide is added in an amount ranging from about 0.1 to about 1.0 wt. % based on the mixture.

2. The method of claim 1 where the phenol aldehyde resin crosslinker is added in an amount ranging from about 0.05 to about 2.0 wt. % based on the mixture.

3. The method of claim 1 where mixture of asphalt and an elastomeric polymer is heated to a temperature between about 130° C. to about 260° C.

4. A method for preparing an asphalt and polymer composition comprising heating a mixture of asphalt and an elastomeric polymer; adding sulfur to the mixture; adding a phenol aldehyde resin crosslinker to the mixture in an amount ranging from about 0.05 to about 2.0 wt. % based on the mixture; and adding ionic metal oxide in an amount ranging from about 0.1 to about 1.0 wt. % based on the mixture, where the sulfur, crosslinker and the ionic metal oxide are added in any order; where the MP1 compatibility of the asphalt and polymer composition is improved as compared with the MP 1 compatibility of an identical asphalt and polymer composition absent the metal oxide.

5. The method of claim 4 where mixture of asphalt and an elastomeric polymer is heated to a temperature between about 130° C. to about 260° C.

6. A polymer modified asphalt (PMA) comprising an asphalt having an elastomeric polymer crosslinked therewith by a phenol aldehyde resin, sulfur and a metal oxide, where the metal of the metal oxide is selected from Group IIB of the Periodic Table (CAS notation), and where the ionic metal oxide is present in an amount ranging from about 0.1 to about 1.0 wt. % based on the amount of asphalt and polymer.

7. The PMA of claim 6 where the phenol aldehyde resin crosslinker is present in an amount ranging from about 0.05 to about 2.0 wt. % based on the amount of asphalt and polymer.

8. A road comprising the PMA of claim 6.

9. A roof sealed with the PMA of claim 6.

10. A method of sealing a roof with PMA comprising heating the PMA of claim 6 and distributing it over at least a portion of roof surface.

11. A method of road building comprising combining the PMA of claim 6 with aggregate to form a road paving material, and forming road pavement with the material.

12. A polymer modified asphalt (PMA) comprising an asphalt having an elastomeric polymer crosslinked therewith by a phenol aldehyde resin in an amount ranging from about 0.05 to about 2.0 wt. % based on the amount of asphalt and polymer and zinc oxide in an amount ranging from about 0.1 to about 1.0 wt. % based on the amount of asphalt and polymer, where the MP1 compatibility of the asphalt and polymer composition is improved as compared with the MP1 compatibility of an identical asphalt and polymer composition absent the metal oxide.

13. The PMA of claim 12 where the elastomeric polymer is a styrene-butadiene copolymer.

* * * * *